Feb. 14, 1961  D. J. McLAREN ET AL  2,971,532
WATER HEATER FITTING FOR DELIVERING TWO
TEMPERATURES OF HEATED WATER
Filed April 5, 1956
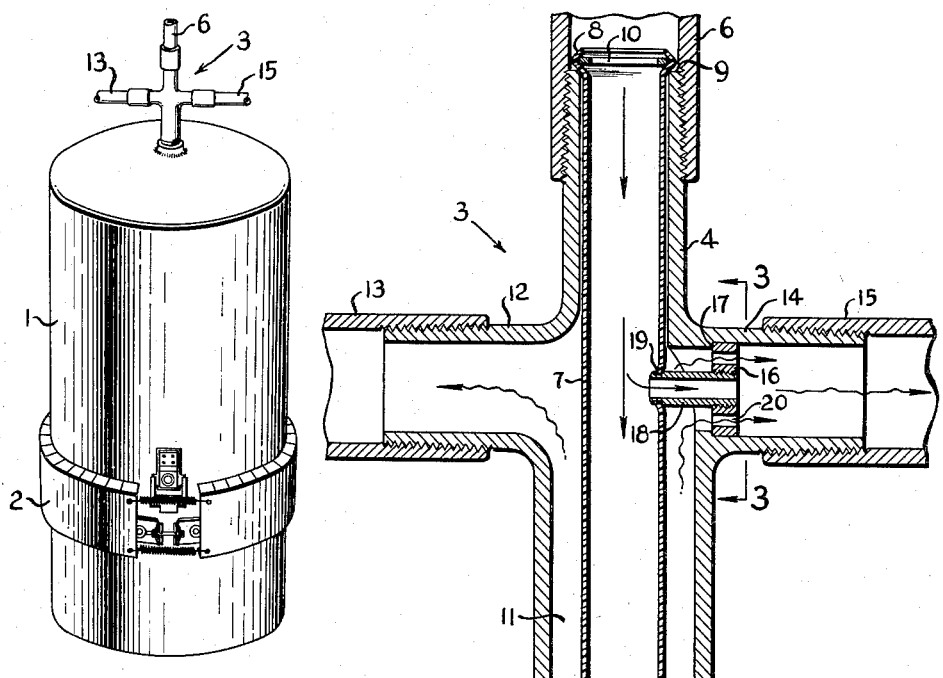
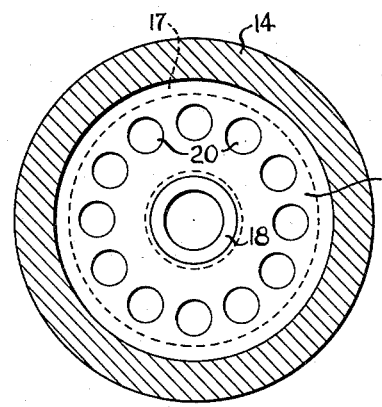
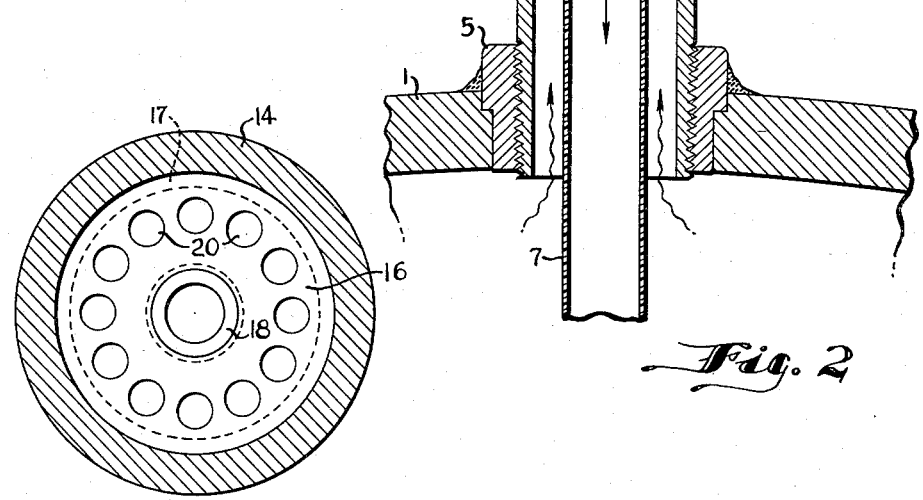
INVENTORS
DAVID J. McLAREN
AND RUSSELL J. SOUCIE
BY
Andrus & Sceales
Attorneys United States Patent Office 2,971,532
Patented Feb. 14, 1961

2,971,532

WATER HEATER FITTING FOR DELIVERING TWO TEMPERATURES OF HEATED WATER

David J. McLaren, Bradley, Ill., and Russell J. Soucie, Benton Harbor, Mich., assignors to A. O. Smith Corporation, Milwaukee, Wis., a corporation of New York Filed Apr. 5, 1956, Ser. No. 576,415

6 Claims. (Cl. 137—592)

This invention relates to a water heater and more particularly to a domestic water heater having a combination inlet-outlet fitting adapted to deliver two temperatures of heated water.

In the past, a domestic water heater has been set to deliver water at sanitizing temperature, which is approximately 180° F. Water at this temperature is necessary for laundry and dishwashing purposes, but it is uneconomical and undesirable to use 180° F. water for bathing, hand laundry and the like. Recently, there has been increased interest and development of mixing valves for installation on domestic type water heaters to deliver two temperatures of heated water. Water at approximately 180° F. would be used for dishwashing and the laundry, while a lower temperature heated water, of approximately 125° F., would be delivered for use in the bathroom.

This two-temperature hot water system provides a feature of safety which eliminates the possibility of scalding during bathing. Secondly, the two-temperature system reduces the waste of hot water and increases the effective capacity of the water heater due to the fact that the 180° F. water of the heater is mixed with cold water to provide the 125° F. water.

The present invention is directed to a combination inlet-outlet fitting for use in a water heater and is adapted to deliver two temperatures of heated water. The fitting includes a mixing valve which blends the cold incoming water with the hot water of the tank to provide a lower or intermediate temperature hot water.

More specifically, the fitting comprises a tubular member which is secured within an opening in the tank. A dip tube is supported on an internal shoulder formed in the tubular member and extends into the interior of the tank. Cold water is introduced into the tank through the dip tube and hot water is withdrawn from the tank through the annular passage between the tubular member and the dip tube.

The tubular member is provided with a pair of outlets which communicate with the annular passage; one of the outlets is adapted to deliver hot water and the second outlet is adapted to supply an intermediate temperature hot water. To provide the intermediate temperature hot water, a tube connects the interior of the dip tube with the second outlet so that a portion of the incoming cold water will be conducted through the tube directly to the second outlet and mixed with the hot water to obtain a lower temperature heated water. The hot and cold water is proportioned to obtain the desired intermediate temperature by an orifice disc located in the second outlet.

The present invention provides a simple and inexpensive apparatus for providing two temperatures of heated water. The structure is combined in one fitting rather than having separate inlet and outlet fittings, and this not only reduces the cost of the structure but reduces the amount of exposed metal area in the tank to be protected from corrosion.

The drawing illustrates the best mode presently contemplated of carrying out the invention.

In the drawing:

Figure 1 is a perspective view of a tank embodying the present invention;

Fig. 2 is an enlarged section of the combination fitting and mixing valve; and

Fig. 3 is a transverse section taken along line 3—3 of Fig. 2.

The drawing illustrates a tank 1 or other container adapted to contain a liquid, such as water, to be heated. The water is heated by any suitable means and, as shown in the drawing, the heating unit consists of a flexible wrap-around electrical heating unit 2 which is secured to the outer surface of the tank.

Water is introduced and withdrawn from the tank through a combination inlet-outlet fitting, indicated generally by 3. The fitting includes a pipe 4 which is threadedly engaged within a spud 5 and communicates with the interior of the tank. The spud is suitably secured within an opening in the upper head of the tank 1.

Cold water is introduced to the fitting through a conduit 6 which is connected to the upper end of the pipe 4 by a suitable coupling, such as by threading pipe 4 into conduit 6. The cold water entering the fitting is conducted through the fitting to the bottom portion of the tank 1 by means of a dip tube 7. The dip tube may be constructed of plastic, metal or fiber material and is formed with an annular shoulder 8 which rests on the upper end 9 of the pipe 4. Collapse of the shoulder 8 is prevented by a ring 10 which is disposed within the upper end of the dip tube.

The dip tube 7 is spaced radially inwardly from the lower portion of the pipe 4 to provide an annular chamber 11 through which hot water from the tank is withdrawn. Hot water from the tank is discharged from the fitting through an outlet 12 which is formed in pipe 4 and communicates with the annular chamber 11. A conduit 13 is connected to the outlet 12 as by threading outlet 12 into conduit 13 and serves to conduct the hot water to the location of use.

In addition to outlet 12, a second outlet 14 is provided in the pipe 4 and the outlet 14 also communicates with the chamber 11. A conduit 15 is connected to the outlet 14 such as by threading outlet 14 into conduit 15.

To deliver a lower temperature heated water from the outlet 14, an orifice disc 16 is disposed within the outlet and seats on a shoulder 17 formed in the inner surface of outlet 14. A portion of the cold water entering the fitting through dip tube 7 is by-passed directly to the outlet 14 by a tube 18 which is secured within a central opening in disc 16 and extends through an opening in the wall of dip tube 7. The tube 18 is retained within the wall of the dip tube by means of a groove 19 which is formed in the outer surface of the tube and receives the dip tube wall. Hot water from chamber 11 flows to outlet 14 in a proportioned amount by providing the disc 16 with a series of orifices 20 through which hot water from the chamber 11 passes.

With this construction, hot water passing from chamber 11 through orifices 20 to outlet 14, is mixed with cold water passing from the dip tube through tube 18 to the outlet 14. The cold water conducted from the dip tube to the outlet reduces the temperature of the hot water so that the water temperature of the water delivered from the outlet 14 is lower than the temperature of the hot water delivered through outlet 12.

The diameter and number of the orifices 20 and the diameter of tube 18 determines the proportion of the hot and cold water entering outlet 14 and thus controls the temperature of the mixed water. The disc 16 is removable from the outlet 14, and by inserting a second disc, having either larger or smaller orifices 20, the water temperature of the mixed water can be readily changed.

The present invention provides a simple mixing device for proportioning hot and cold water to obtain a second heated water temperature. The entire structure is combined in a single fitting through which cold water is introduced and two temperatures of hot water are withdrawn. By combining the entire structure in a single fitting, an opening in the tank wall 1 is eliminated. This elimination of an opening and the consequent elimination of a second fitting reduces the corrosion problem in the tank due to the fact that the amount of exposed metal area in the tank to be protected from corrosion is decreased.

Various modes of carrying out the invention are contemplated as being within the scope of the following claims particularly pointing out and distinctly claiming the subject matter which is regarded as the invention.

We claim:

1. A fitting for a tank containing hot water or the like, which comprises an outer tubular member adapted to be secured within an opening in the upper head of the tank and adapted to communicate with the interior of the tank, a dip tube disposed within the tubular member and adapted to extend downwardly within the tank and terminating at a position adjacent the bottom of the tank and adapted to conduct cold water to the tank, said dip tube being spaced radially inwardly from the tubular member to provide an annular chamber therebetween for the discharge of hot water from the tank, said dip tube being formed with an outwardly flared upper end portion disposed to rest on a shoulder formed in said tubular member to support the dip tube in a concentric relation within the tubular member, a pair of outlets formed in the outer tubular member and disposed in communication with the chamber, one of said outlets being adapted to deliver hot water and the second outlet being adapted to deliver water at an intermediate temperature, a proportioning member disposed in the second outlet and adapted to control the flow of water through the second outlet, and a tubular member connecting the dip tube with the proportioning member and adapted to conduct a portion of the cold water from the dip tube directly to the second outlet to thereby obtain mixed hot and cold water and an intermediate water temperature.

2. A fitting for a tank containing hot water or the like, which comprises an outer tubular member adapted to be secured within an opening in the upper head of the tank and adapted to communicate with the interior of the tank, a dip tube disposed within the tubular member and adapted to extend downwardly within the tank and to terminate at a position adjacent the bottom of the tank and adapted to conduct cold water to the tank, means for supporting the dip tube from the tubular member with said dip tube being spaced radially inwardly from the tubular member to provide an annular chamber therebetween for the discharge of hot water from the tank, a pair of outlets formed in the outer tube and disposed in communication with the chamber, one of said outlets being adapted to deliver hot water and the second outlet being adapted to deliver water at an intermediate temperature, conduit means directly connecting the dip tube with said second outlet for conducting a portion of the cold water in the dip tube to said second outlet, and proportioning means disposed in said second outlet for proportioning the cold water and hot water to obtain a mixed water of a uniform temperature.

3. A fitting to be connected to a single opening in a tank containing hot water or the like, comprising an outer tubular member adapted to be secured within the opening in the tank and having a first opening adapted to communicate with the interior of the tank and having a second opening disposed in substantial alignment with said first opening and adapted to communicate with a source of cold water, said outer member having a third opening adapted to discharge hot water and having a fourth opening adapted to discharge water at an intermediate temperature, an inner tubular member disposed within the outer tubular member with the outer end of said inner tubular member communicating with said second opening and the inner end of said inner tubular member extending through said first opening and adapted to extend within the tank, said inner tubular member being of a smaller diameter than said outer tubular member to provide a passage therebetween with said passage providing communication between said first opening and said third and fourth openings and serving to conduct hot water from the tank to the third and fourth openings, means for providing a substantially water tight connection between the outer end portion of said inner tubular member and said outer tubular member to provide for direct flow of cold incoming water through the inner tubular member to the tank, water proportioning means disposed in said outer tubular member for controlling the flow of hot water through the fourth opening, and means connecting the inner tubular member with said fourth opening for conducting a portion of the cold water directly to the fourth opening to thereby obtain a mixing of hot and cold water and an intermediate water temperature.

4. A fitting to be connected to a single opening in a tank containing hot water or the like, comprising a housing adapted to be secured within the opening in the tank and having a first opening adapted to communicate with the interior of the tank and having a second opening adapted to communicate with a source of cold water, said housing having a third opening adapted to discharge hot water and having a fourth opening adapted to discharge water at an intermediate temperature, a dip tube disposed within the housing with the outer end of said dip tube communicating with said second opening and the inner end of said dip tube extending through said first opening and adapted to extend within the tank, said dip tube being spaced radially inward of the housing to provide an annular passage therebetween with said passage providing communication between said first opening and said third and fourth openings and serving to conduct hot water from the tank to the third and fourth openings, means associated with the housing for supporting the dip tube and providing a seal between the dip tube and said housing adjacent said second opening to provide for direct flow of cold water from the source into said dip tube and prevent entry of the cold water into said passage, water proportioning means disposed in said housing for controlling the flow of hot water through the fourth opening, and a tube connecting said dip tube and the water proportioning means and serving to conduct a portion of the cold water directly to the fourth opening for mixing with hot water to obtain water of an intermediate temperature.

5. A fitting to be connected to a single opening in the tank containing hot water or the like, comprising a housing adapted to be secured within the opening in the tank and having a first opening adapted to communicate with the interior of the tank and having a second opening disposed in substantial alignment with said first opening and adapted to communicate with a source of cold water, said housing having a third opening adapted to discharge hot water and having a fourth opening adapted to discharge water at an intermediate temperature, a dip tube disposed within the housing with the outer end of said dip tube communicating with said second opening and the inner end of the dip tube extending through said first opening and adapted to extend within the tank, said dip tube being spaced radially inward of the housing to provide an annular passage therebetween with said passage providing communication between said first opening and said third and fourth openings and serving to conduct hot water from the tank to the third and fourth openings, means associated with the housing for supporting the dip tube and providing a seal between the dip tube and said housing adjacent said second opening to provide for direct flow of cold water from the source into said dip tube and prevent entry of the cold water into said passage, and means connecting the dip tube directly to said fourth opening for conducting a portion of the cold water directly to the fourth opening to obtain a mixing of hot and cold water and an intermediate temperature.

6. A fitting to be connected to a single opening in a tank containing hot water or the like, comprising hot water conduit means adapted to be secured within the opening of the tank and having a first opening adapted to communicate with the interior of the tank and having a high temperature outlet opening adapted to discharge high temperature hot water and having an intermediate temperature outlet opening adapted to discharge water at an intermediate temperature, cold water conduit means disposed within said hot water conduit means and spaced therefrom to provide a passage therebetween, said passage providing communication between said first opening and said high temperature outlet opening and said intermediate temperature outlet opening and serving to conduct hot water from the tank to said high temperature and intermediate temperature openings, the outer end of said cold water conduit means communicating with a cold water supply and the inner end of said cold water conduit means extending beyond said first opening and adapted to extend a substantial distance into said tank, and by-pass conduit means connecting said cold water conduit means and said intermediate temperature outlet opening for conducting a portion of the cold water directly to said intermediate temperature outlet opening to thereby obtain a mixing of hot and cold water and an intermediate water temperature.

References Cited in the file of this patent

UNITED STATES PATENTS

| | | |
|---|---|---|
| 1,247,374 | Chubb | Nov. 20, 1917 |
| 1,455,069 | Bluemel | May 15, 1923 |
| 1,576,662 | Leonard | Mar. 16, 1926 |
| 1,863,273 | Hofferbert | June 14, 1932 |
| 1,891,926 | Hall | Dec. 27, 1932 |
| 1,962,214 | Russell et al. | June 12, 1934 |
| 1,985,929 | Jorgensen et al. | Jan. 1, 1935 |
| 1,987,366 | Ford | Jan. 8, 1935 |
| 2,600,521 | Swisher | June 17, 1952 |
| 2,621,901 | Wheeler | Dec. 16, 1952 |
| 2,652,926 | Jernigan | Sept. 22, 1953 |
| 2,656,981 | Schoerner | Oct. 27, 1953 |
| 2,781,174 | Smith | Feb. 12, 1954 |
| 2,895,676 | Kraft | July 21, 1959 |

FOREIGN PATENTS

| | | |
|---|---|---|
| 414,512 | Great Britain | Aug. 9, 1934 |